US010753318B2

(12) United States Patent
Sawaki (10) Patent No.: US 10,753,318 B2
(45) Date of Patent: Aug. 25, 2020

(54) INTERNAL COMBUSTION ENGINE

(71) Applicant: TOYOTA JIDOSHA KABUSHIKI KAISHA, Toyota-shi (JP)

(72) Inventor: Atsushi Sawaki, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/366,564

(22) Filed: Mar. 27, 2019

(65) Prior Publication Data
US 2019/0331065 A1    Oct. 31, 2019

(30) Foreign Application Priority Data

Apr. 26, 2018  (JP) .................................. 2018-084999

(51) Int. Cl.
| F02B 47/08 | (2006.01) |
| F02M 26/12 | (2016.01) |
| F02M 26/09 | (2016.01) |
| F02D 41/00 | (2006.01) |
| F02F 7/00 | (2006.01) |
| F02M 26/11 | (2016.01) |

(52) U.S. Cl.
CPC ......... *F02M 26/12* (2016.02); *F02D 41/0077* (2013.01); *F02F 7/0043* (2013.01); *F02M 26/09* (2016.02); *F02M 26/11* (2016.02)

(58) Field of Classification Search
CPC ........ F02M 26/12; F02M 26/09; F02M 26/11; F02D 41/0077; F02F 7/0043

USPC .............. 123/568.12, 568.17, 568.18, 195 A
See application file for complete search history.

(56) References Cited

U.S. PATENT DOCUMENTS 6,460,522 B1 * 10/2002 Rimnac .................. F02D 23/00
                                                              123/568.24
2018/0030876 A1 * 2/2018 Miyoshi ................. F02M 26/15

FOREIGN PATENT DOCUMENTS

JP          2015-203353        11/2015

* cited by examiner

*Primary Examiner* — Hai H Huynh
(74) *Attorney, Agent, or Firm* — Oblon, McClelland, Maier & Neustadt, L.L.P.

(57) ABSTRACT

An internal combustion engine includes a main body including an attachment portion; an EGR cooler including a portion fastened to the main body; and an EGR valve including a fixing portion fastened to the attachment portion with a bolt and a connection portion fastened to the EGR cooler. A pin is fixed to one of the fixing portion and the attachment portion. An insertion hole into which the pin is inserted is arranged in the other one of the fixing portion and the attachment portion. An inner diameter of the insertion hole is greater than an outer diameter of the pin, and a value obtained by subtracting the outer diameter of the pin from the inner diameter of the insertion hole is less than a value obtained by subtracting a shank diameter of the bolt from an inner diameter of a bolt hole in the fixing portion.

3 Claims, 6 Drawing Sheets

INTERNAL COMBUSTION ENGINE

BACKGROUND

1. Field

The present disclosure relates to an internal combustion engine.

2. Description of Related Art

Japanese Laid-Open Patent Publication No. 2015-203353 discloses an internal combustion engine including an exhaust gas recirculation device that returns part of exhaust gas to an intake passage.

The exhaust gas recirculation device includes, for example, an EGR cooler, which lowers the temperature of the exhaust gas returned to the intake passage, and an EGR valve, which is connected to the EGR cooler to adjust the flow rate of the exhaust gas returned to the intake passage. The EGR cooler and the EGR valve are fixed to a main body of the internal combustion engine.

In a state in which the EGR cooler and the EGR valve are coupled to the main body of the internal combustion engine, a manufacturing error, a coupling error, or the like may displace the EGR cooler and the EGR valve at a location where they are connected to each other. This may form a gap at the connection location. Even if such a gap is formed, the EGR cooler and the EGR valve can be fixed to each other to eliminate the gap and ensure the seal at the connection location. However, when firmly fixing the EGR cooler and the EGR valve at the connection location so as to eliminate the gap, the EGR cooler is bent and deformed. This may generate stress at the EGR cooler.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It is an object of the present disclosure to provide an internal combustion engine that reduces stress generated at an EGR cooler.

According to one aspect of the present disclosure, an internal combustion engine includes a main body of the internal combustion engine including an attachment portion; an EGR cooler including a portion fastened to the main body of the internal combustion engine, wherein the EGR cooler is configured to lower a temperature of exhaust gas returned to an intake passage of the internal combustion engine; and an EGR valve including a fixing portion fastened to the attachment portion with a bolt and a connection portion fastened to the EGR cooler, wherein the EGR valve is configured to adjust a flow rate of the exhaust gas returned to the intake passage, wherein a pin is fixed to one of the fixing portion and the attachment portion, an insertion hole into which the pin is inserted is arranged in the other one of the fixing portion and the attachment portion, an inner diameter of the insertion hole is greater than an outer diameter of the pin, and a value obtained by subtracting the outer diameter of the pin from the inner diameter of the insertion hole is less than a value obtained by subtracting a shank diameter of the bolt from an inner diameter of a bolt hole in the fixing portion into which the bolt is inserted.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

First Embodiment

An internal combustion engine according to a first embodiment will now be described with reference to the drawings.

An internal combustion engine 10 includes a plurality of cylinders. In the description hereafter, the direction in which the cylinders are lined is referred to as the "longitudinal direction L" of the internal combustion engine 10. Arrow L indicates the "longitudinal direction L" in FIGS. 1, 2, and 4. Further, a direction orthogonal to both the direction in which pistons of the internal combustion engine 10 are reciprocated and the longitudinal direction L is referred to as the "widthwise direction W" of the internal combustion engine 10. Arrow W indicates the "widthwise direction W" in FIGS. 1, 2, and 4. A direction orthogonal to both the "longitudinal direction L" and the " widthwise direction W" is referred to as the "vertical direction H" of the internal combustion engine 10. Arrow H indicates the "vertical direction H" in FIGS. 1, 3, 5, and 6.

Figure 1:
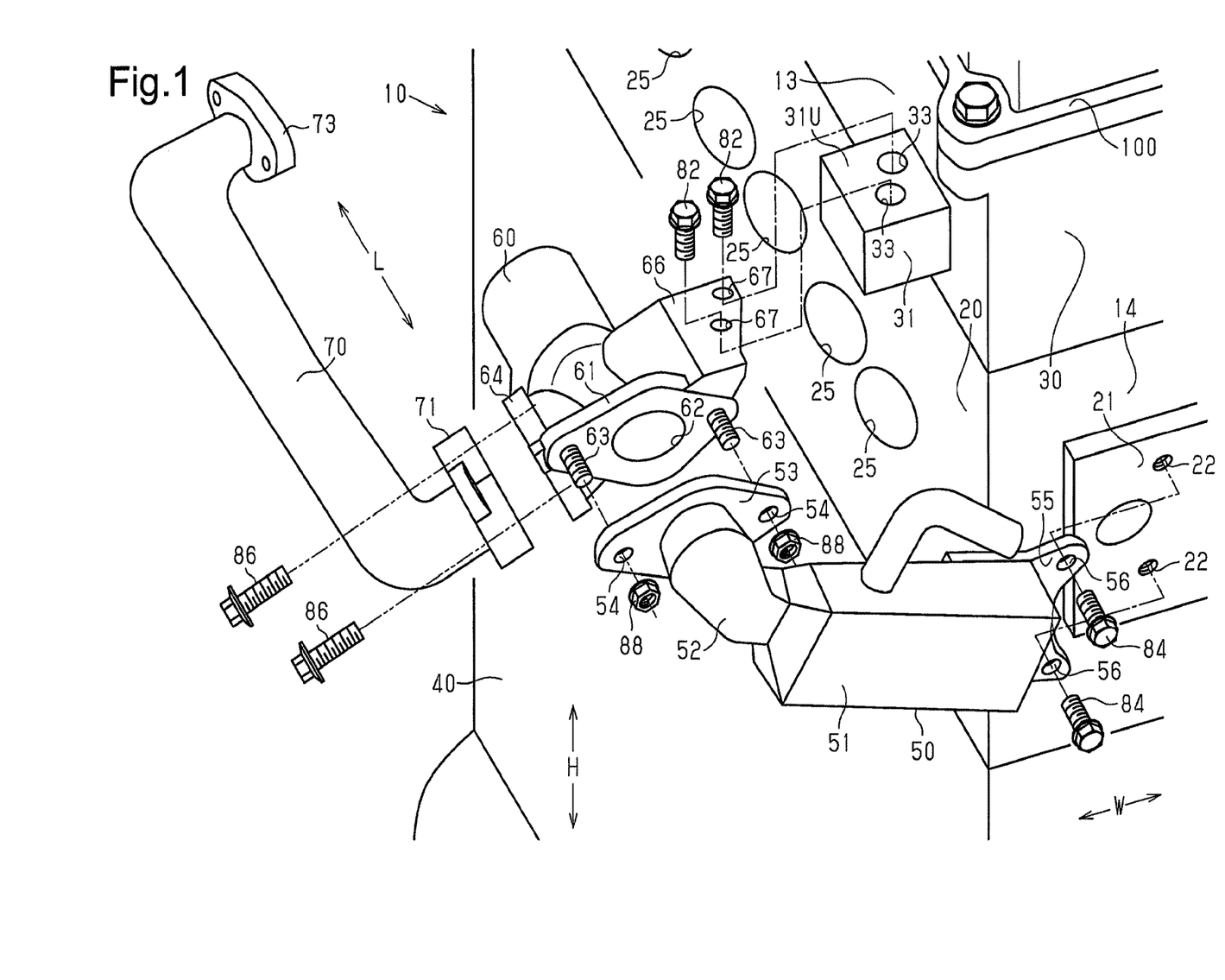
FIG. 1 is a perspective view showing an internal combustion engine according to a first embodiment.
Figure 2:
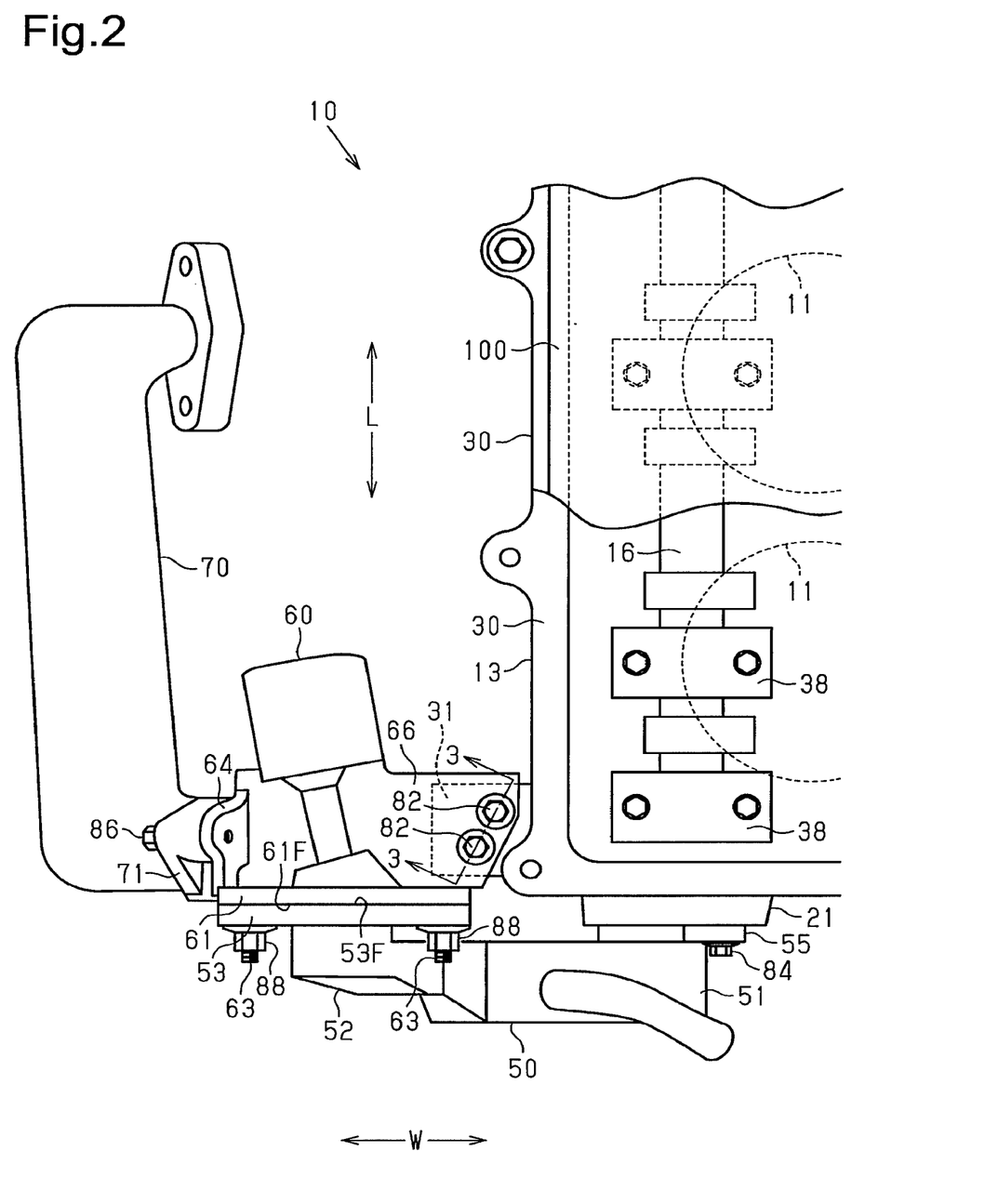
FIG. 2 is a schematic plan view showing the internal combustion engine in FIG. 1.

As shown in FIGS. 1 and 2, the internal combustion engine 10 includes a cylinder block 40 that accommodates the pistons in a manner allowing the pistons to reciprocate.

A cylinder head 20 that forms combustion chambers (see FIG. 2) is mounted on the cylinder block 40. The cylinder head 20 includes a side surface extending in the longitudinal direction L. A plurality of intake ports 25 extend through the side surface.

A cam housing 30 is mounted on the cylinder head 20. The cam housing 30 includes bearings 38 (see FIG. 2) of a camshaft 16 (see FIG. 2) that drives intake valves and bearings of a camshaft that drives exhaust valves.

A cylinder head cover 100 is mounted on the cam housing 30.

The internal combustion engine 10 includes an exhaust gas recirculation device that returns part of exhaust gas to an intake passage. The exhaust gas recirculation device includes, for example, an EGR cooler 50, which lowers the temperature of the exhaust gas returned to the intake passage, and an EGR valve 60, which is connected to the EGR cooler 50 to adjust the flow rate of the exhaust gas returned to the intake passage.

The EGR cooler 50 includes a cooling unit 51, which is substantially box-shaped, to cool the exhaust gas with coolant. The surface of the cooling unit 51 that faces the cylinder head 20 includes an opening through which exhaust gas is drawn from the cylinder head.

A pipe 52 through which the exhaust gas cooled by the cooling unit 51 flows is connected to one of the two ends of the cooling unit 51 in the longitudinal direction of the cooling unit 51. The pipe 52 is curved to extend in a direction substantially orthogonal to the longitudinal direction of the cooling unit 51. The pipe 52 includes a first cooler flange 53 at the distal end of the pipe 52. The first cooler flange 53 is flat and extends in the longitudinal direction of the cooling unit 51. Further, the first cooler flange 53 includes holes 54 at symmetric positions with respect to the pipe 52. The other one of the two ends of the cooling unit 51 in the longitudinal direction of the cooling unit 51 includes a second cooler flange 55. The second cooler flange 55 is flat and extends in the longitudinal direction of the cooling unit 51. Further, the second cooler flange 55 includes two holes 56 into which bolts 84 are inserted. The second cooler flange 55 defines a portion where the EGR cooler 50 is fastened to a main body of the internal combustion engine. The main body of the internal combustion engine includes, for example, the cylinder head 20, the cam housing 30, and the cylinder block 40.

The EGR valve 60 includes a flat first valve flange 61 connected to the first cooler flange 53. A central portion of the first valve flange 61 includes an exhaust gas opening 62. The exhaust gas opening 62, which draws exhaust gas into the EGR valve 60, is in communication with the pipe 52 when the first cooler flange 53 is coupled to the first valve flange 61. Stud bolts 63, which are located at symmetric positions with respect to the exhaust gas opening 62, are inserted through the corresponding holes 54 of the first valve flange 61. The first valve flange 61 defines a connection portion fastened to the EGR cooler 50.

The EGR valve 60 also includes a second valve flange 64 extending in a direction substantially orthogonal to the flange surface of the first valve flange 61. An inlet flange 71, which is arranged on an end of an EGR supply pipe 70 that connects the EGR valve 60 to an intake manifold (not shown) of the internal combustion engine 10, is fastened by bolts 86 to the second valve flange 64. Further, an outlet flange 73 is arranged on the end of the EGR supply pipe 70 opposite to the end where the inlet flange 71 is arranged. The outlet flange 73 is connected to an EGR port (not shown) of the intake manifold.

The EGR valve 60 also includes a flat fixing portion 66 extending in a direction substantially orthogonal to the flange surface of the first valve flange 61. The fixing portion 66 includes two bolt holes 67 that are arranged next to each other. Bolts 82 are inserted into the bolt holes 67. The two bolt holes 67 have the same construction.

The EGR cooler 50 and the EGR valve 60 are fixed to the internal combustion engine 10 in the manner described below.

The cam housing 30 includes a side surface 13 extending in the longitudinal direction L. The side surface 13 of the cam housing 30 extends in the same direction as the side surface of the cylinder head 20 through which the intake ports 25 extend. An attachment portion 31 projects in the widthwise direction W from the side surface 13 of the cam housing 30. The attachment portion 31 includes two bolt fastening portions 33 that are arranged next to each other. The bolts 82 are inserted into the bolt fastening portions 33. The two bolt fastening portion 33 have the same construction. The bolts 82 fasten the fixing portion 66 of the EGR valve 60 to an upper surface 31U of the attachment portion 31. The number of bolts 82 may be changed.

The cylinder head 20 includes a side surface 14 extending in the widthwise direction W. The side surface 14 of the cylinder head 20 includes a boss portion 21 to which the second cooler flange 55 of the EGR cooler 50 is fixed. The boss portion 21 includes internal thread portions 22 with which external threads of the bolts 84 inserted through the corresponding holes 56 of the second cooler flange 55 are engaged.

The constructions of the bolt holes 67 extending through the fixing portion 66 and the bolt fastening portions 33 arranged next to each other in the attachment portion 31 will now be described.

Figure 3:
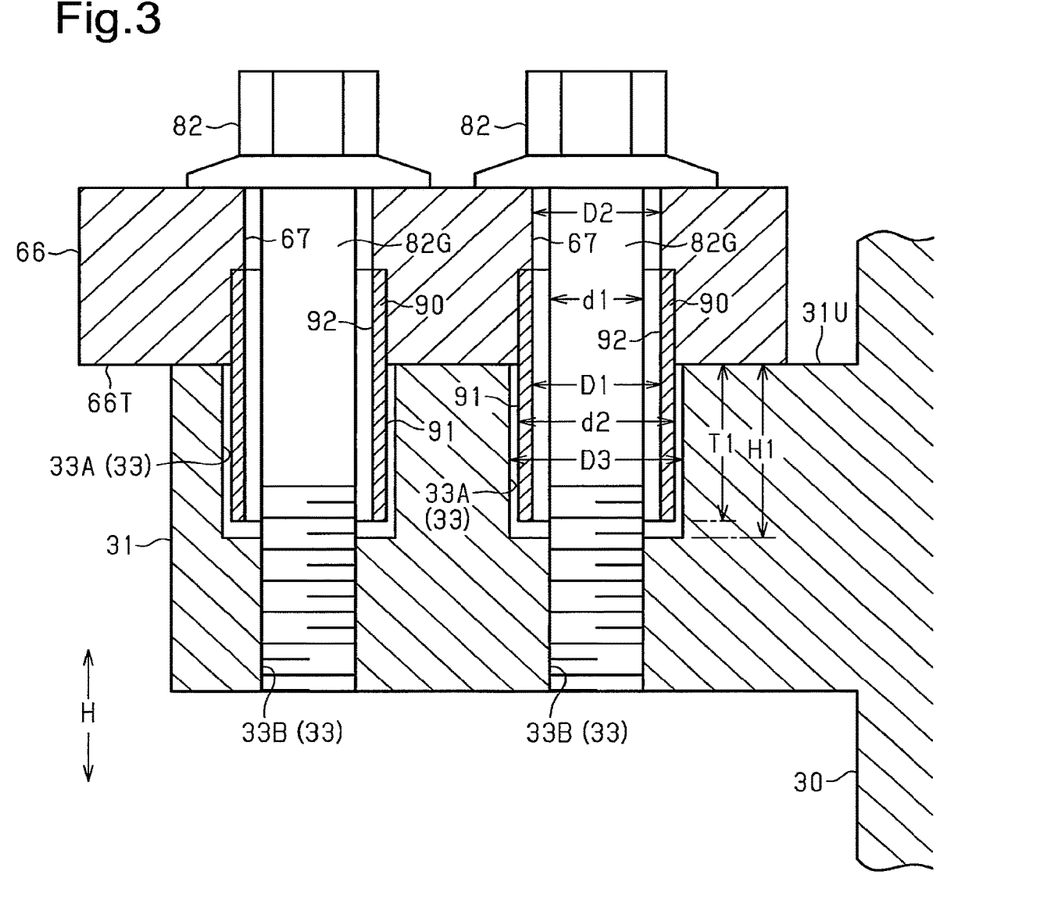
FIG. 3 is a cross-sectional view taken along line 3-3 in FIG. 2.

FIG. 3 is a cross-sectional view of the attachment portion 31 cut in the vertical direction H when the fixing portion 66 of the EGR valve 60 is coupled to the attachment portion 31 of the cam housing 30.

Cylindrical pins 90 are press-fitted into the bolt holes 67 of the fixing portion 66 coaxially with the bolt holes 67. The pins 90 are press-fitted upward from a lower surface 66T of the fixing portion 66, and the lower parts of the pins 90 project downward from the lower surface 66T of the fixing portion 66. An inner diameter D1 of the pin 90 is set to be substantially the same as an inner diameter D2 of the bolt hole 67. Further, the inner diameter D1, which is the diameter of an inner circumferential surface 92 of the pin 90, is set to be greater than a shank diameter d1 of an externally threaded bolt shank 82G (D1>d1) of the bolt 82. The bolt 82 projecting out of the bolt hole 67 is inserted into the inner diameter portion of the pin 90. That is, the pin 90 is a hollow rod, and the bolt 82 is inserted into the pin 90.

Each bolt fastening portion 33 of the attachment portion 31 includes an insertion hole 33A and an internal thread portion 33B. The insertion hole 33A into which the corresponding pin 90 is inserted extends downward from the upper surface 31U of the attachment portion 31. The internal thread portion 33B is coaxial with the insertion hole 33A and arranged downward from the insertion hole 33A. The external thread of the bolt 82 is engaged with the internal thread portion 33B.

A depth H1 of the insertion hole 33A from the upper surface 31U is set to be greater than or equal to a projection length T1 of the pin 90 from the lower surface 66T (H1≥T1).

An inner diameter D3 of the insertion hole 33A is set to be greater than an outer diameter d2, which is the diameter of an outer circumferential surface 91 of the pin 90 (D3>d2).

A value obtained by subtracting the outer diameter d2 of the pin 90 from the inner diameter D3 of the insertion hole 33A is referred to as a clearance value C1 (C1=D3−d2). Further, a value obtained by subtracting the shank diameter d1 of the bolt shank 82G from the inner diameter D2 of the bolt hole 67 is referred to as a clearance value C2 (C2=D2−d1). The clearance value C1 is less than the clearance value C2 (C1<C2).

The EGR cooler 50 and the EGR valve 60 are coupled to the main body of the internal combustion engine in the manner described below.

As shown in FIG. 3, in a state in which the pins 90 of the fixing portion 66 are inserted into the insertion holes 33A of the attachment portion 31 and the lower surface 66T of the fixing portion 66 is placed on the upper surface 31U of the attachment portion 31, the bolts 82 that fasten the fixing portion 66 to the attachment portion 31 are inserted into the corresponding bolt holes 67 of the fixing portion 66. Then, the inserted bolts 82 are temporarily fastened to the internal thread portions 33B of the attachment portion 31. This temporarily couples the EGR valve 60 to the attachment portion 31 of the internal combustion engine 10.

Further, referring to FIG. 1, after the two stud bolts 63 of the EGR valve 60 are inserted into the corresponding holes 54 of the first cooler flange 53, nuts 88 are temporarily fastened to the stud bolts 63. This temporarily couples the EGR valve 60 to the EGR cooler 50.

Further, in a state in which the two holes 56 of the second cooler flange 55 are aligned with the two corresponding internal thread portions 22 in the boss portion 21 of the cylinder head 20, the two bolts 84 are inserted into the two corresponding holes 56 and temporarily fastened to the two internal thread portions 22 of the boss portion 21. This temporarily couples the EGR cooler 50 to the boss portion 21 of the internal combustion engine 10.

As shown in FIG. 2, by fully fastening the nuts 88, a flange surface 61F of the first valve flange 61 of the EGR valve 60 comes into contact with a flange surface 53F of the first cooler flange 53 that faces the flange surface 61F. This completes the coupling of the EGR valve 60 and the EGR cooler 50.

Then, by fully fastening the bolts 82, the coupling of the EGR valve 60 to the attachment portion 31 is completed. Subsequently, by fully fastening the bolts 84 (see FIG. 1), the coupling of the EGR cooler 50 to the boss portion 21 is completed. Alternatively, the coupling of the EGR valve 60 to the attachment portion 31 completed by fully fastening the bolts 82 may be performed after coupling of the EGR cooler 50 to the boss portion 21 is completed by fully fastening the bolts 84 (see FIG. 1).

The EGR supply pipe 70 is coupled to the EGR valve 60 with the bolts 86.

The operation and advantages of the first embodiment will now be described.

Figure 4:
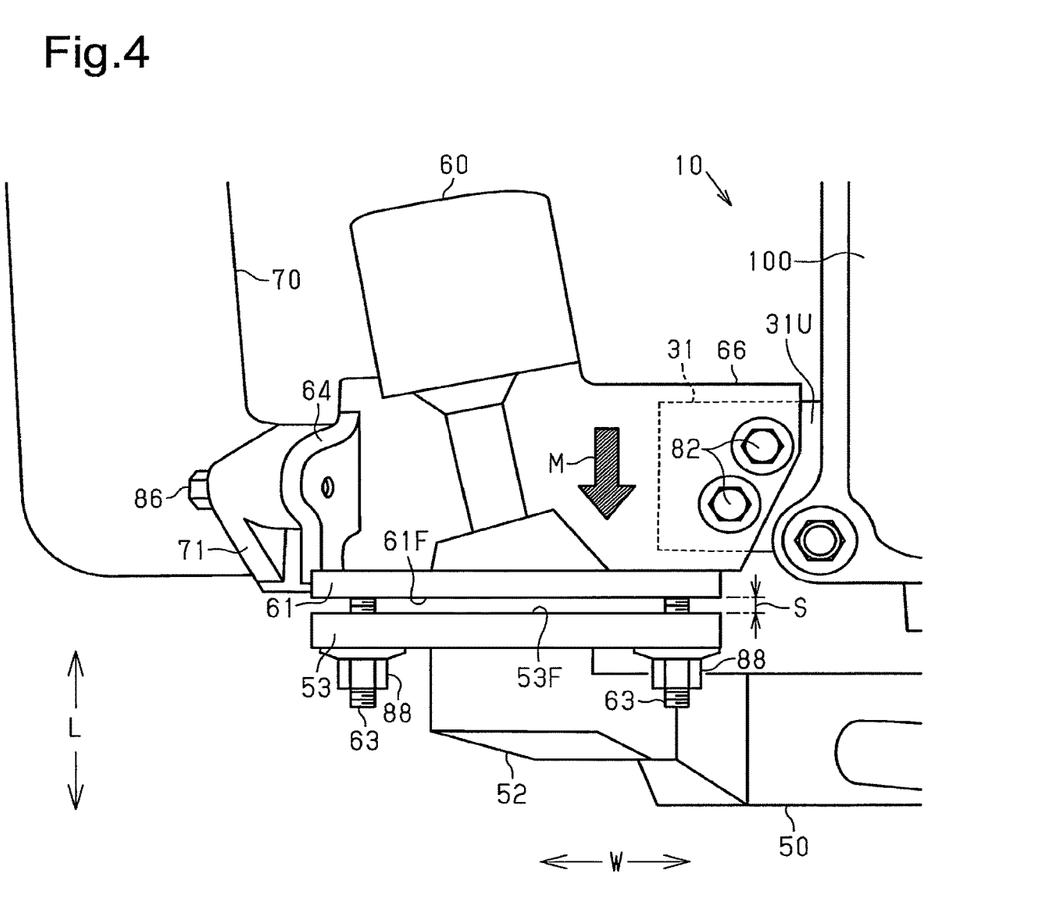
FIG. 4 is a schematic view showing the internal combustion engine in FIG. 1 seen from above.

(1) As shown in FIG. 4, in a state in which the EGR cooler 50 and the EGR valve 60 are coupled to the main body of the internal combustion engine, a manufacturing error, a coupling error, or the like of components may form a gap S at a location where the EGR cooler 50 is connected to the EGR valve 60, that is, between the flange surface 53F of the first cooler flange 53 and the flange surface 61F of the first valve flange 61.

If the gap S is formed and the EGR valve 60 is firmly fixed to the attachment portion 31, when the nuts 88 coupled to the stud bolts 63 of the EGR valve 60 are fully fastened, this may result in the following situation. The gap S will be eliminated, and the seal between the flange surface 53F and the flange surface 61F will be ensured as the EGR cooler 50 bends and the flange surface 53F of the first cooler flange 53 moves toward the flange surface 61F of the first valve flange 61. However, in this case, the EGR cooler 50 is bent and deformed to eliminate the gap S. This may generate stress at the EGR cooler 50.

In this respect, as shown in FIG. 3, the pins 90 are press-fitted into the fixing portion 66 of the EGR valve 60 in the first embodiment. The inner diameter D3 of the insertion holes 33A, into which the pins 90 are inserted and extended in the attachment portion 31 of the cam housing 30, is set to be greater than the outer diameter d2 of the pins 90.

Thus, in a state in which the fixing portion 66 of the EGR valve 60 is temporarily coupled to the attachment portion 31 of the cam housing 30, the pins 90 are movable in the radial direction of the insertion holes 33A in the insertion holes 33A. That is, in the temporary coupling state, the EGR valve 60 is movable on the upper surface 31U of the attachment portion 31 to the extent allowed by the clearance value C1 at maximum.

Thus, even if the gap S is formed in the temporary coupling state as shown in FIG. 4, by fully fastening the nuts 88 to the stud bolts 63 of the EGR valve 60, the EGR valve 60 will be moved so that the flange surface 61F of the first valve flange 61 moves toward the flange surface 53F of the first cooler flange 53. For example, as shown in FIG. 4, the EGR valve 60 is moved in the direction indicated by arrow M. Such a movement of the EGR valve 60 limits bending of the EGR cooler 50 when the gap S is eliminated. This reduces the stress generated at the EGR cooler 50.

(2) Further, the clearance value C1 is set to be less than the clearance value C2, which is a value obtained by subtracting the shank diameter d1 of the bolt 82 from the inner diameter D2 of the bolt hole 67 into which the bolt 82 that fastens the fixing portion 66 to the attachment portion 31 is inserted. In other words, the clearance between the inner circumferential surface of the insertion hole 33A and the outer circumferential surface 91 of the pin 90 is less than the clearance between the inner circumferential surface of the bolt hole 67 and the outer circumferential surface of the bolt shank 82G. This improves the positioning accuracy of the EGR valve 60 in a state in which the fixing portion 66 of the EGR valve 60 is temporarily coupled to the attachment portion 31 in comparison with a structure that does not include the insertion holes 33A and the pins 90.

Second Embodiment

An internal combustion engine according to a second embodiment will now be described with reference to the drawings.

Figure 5:
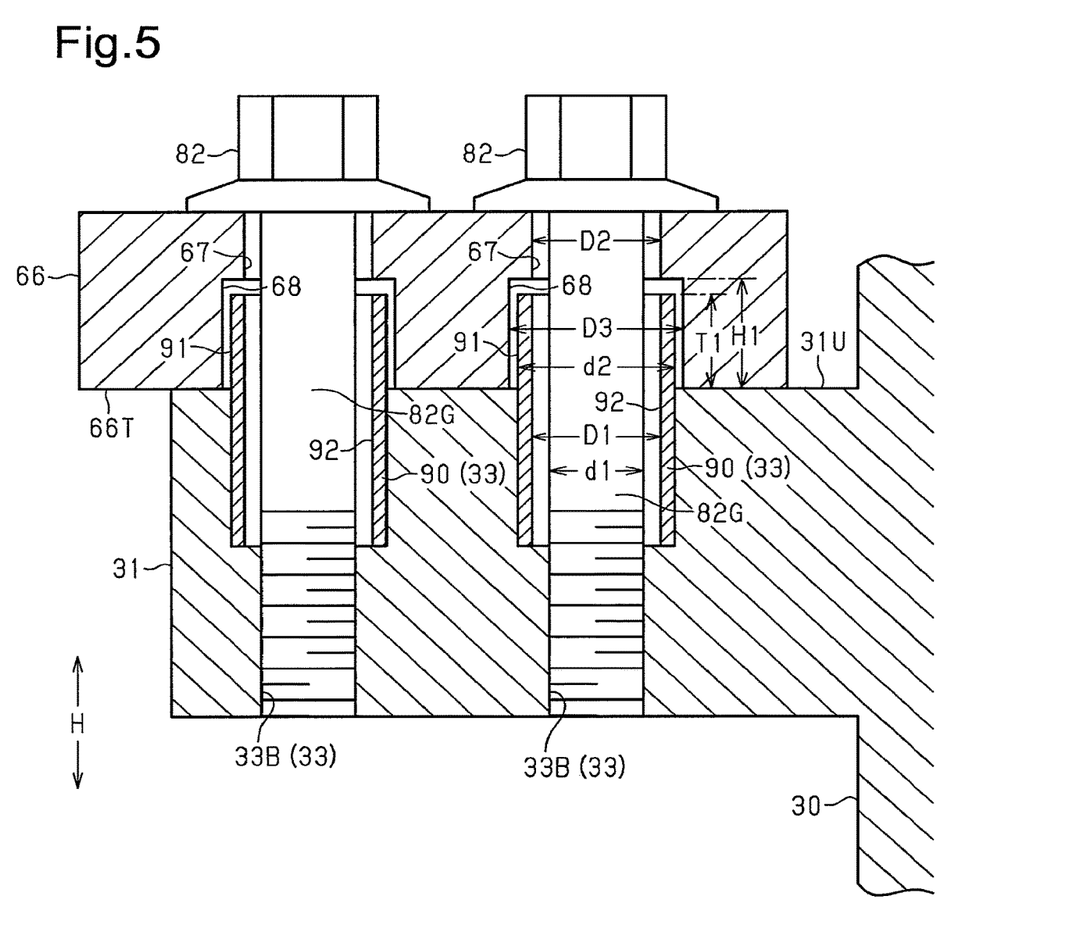
FIG. 5 is a cross-sectional view showing a fixing portion and an attachment portion in an internal combustion engine according to a second embodiment.

In the first embodiment, the pins 90 are arranged in the fixing portion 66 of the EGR valve 60, and the insertion holes 33A into which the pins 90 are inserted are arranged in the attachment portion 31 of the cam housing 30. The second embodiment differs from the first embodiment in that the pins 90 are arranged in the attachment portion 31 and insertion holes 68 into which the pins 90 are inserted are arranged in the fixing portion 66. The description hereafter will focus on differences of an internal combustion engine according to the second embodiment from the first embodiment. In FIG. 5, same reference numerals are given to those components that are the same as the corresponding components of the first embodiment.

FIG. 5 is a cross-sectional view of the attachment portion 31 cut in the vertical direction H when the fixing portion 66 of the EGR valve 60 is coupled to the attachment portion 31 of the cam housing 30.

As shown in FIG. 5, the cylindrical pins 90 are press-fitted into the attachment portion 31. Each pin 90 is press-fitted downward from the upper surface 31U of the attachment portion 31, and the upper portion of the pins 90 projects upward from the upper surface 31U of the attachment portion 31.

The attachment portion 31 includes the internal thread portions 33B, which are coaxial with the pins 90, located downward from the pins 90. The external threads of the bolts 82 that fix the EGR valve 60 to the attachment portion 31 are engaged with the internal thread portions 33B. In the second embodiment, each bolt fastening portion 33 includes the pin 90 and the internal thread portion 33B.

The fixing portion 66 includes the insertion holes 68 that are coaxial with the bolt holes 67. The pins 90 are inserted into the insertion holes 68. The insertion holes 68 extend upward from the lower surface 66T of the fixing portion 66.

The inner diameter D1 of the pin 90 is set to be substantially the same as the inner diameter D2 of the bolt hole 67. Further, the inner diameter D1, which is the diameter of the inner circumferential surface 92 of the pin 90, is set to be greater than the shank diameter d1 of the bolt shank 82G (D1>d1). The bolt 82 inserted through the bolt hole 67 is further inserted into the pin 90. That is, the pin 90 is a hollow rod, and the bolt 82 is inserted into the pin 90.

A depth H1 of the insertion hole 68 from the lower surface 66T is set to be greater than or equal to a projection length T1 of the pin 90 from the upper surface 31U (H1≥T1).

An inner diameter D3 of the insertion hole 68 is set to be greater than the outer diameter d2, which is the diameter of the outer circumferential surface 91 of the pin 90 (D3>d2).

A value obtained by subtracting the outer diameter d2 of the pin 90 from the inner diameter D3 of the insertion hole 68 is referred to as a clearance value C1 (C1=D3−d2). Further, a dimensional difference obtained by subtracting the shank diameter d1 of the bolt shank 82G from the inner diameter D2 of the bolt hole 67 is referred to as a clearance value C2 (C2=D2−d1). The clearance value C1 is less than the clearance value C2 (C1<C2).

The operation and advantages of the second embodiment will now be described.

(1) As shown in FIG. 5, the pins 90 are press-fitted into the attachment portion 31 of the cam housing 30. The inner diameter D3 of each insertion hole 68, into which the pins 90 are inserted, in the fixing portion 66 of the EGR valve 60 is set to be greater than the outer diameter d2 of the pins 90.

Thus, in a state in which the fixing portion 66 of the EGR valve 60 is temporarily coupled to the attachment portion 31 of the cam housing 30, the pins 90 are movable in the radial direction of the insertion holes 68 inside the insertion holes 68. That is, in the temporary coupling state, the EGR valve 60 is movable on the upper surface 31U of the attachment portion 31 to the extent allowed by the clearance value C1 at maximum.

Thus, the second embodiment has the same advantages as the first embodiment described with reference to FIG. 4 and the like. Specifically, even if the gap S is formed in a state in which the fixing portion 66 of the EGR valve 60 is temporarily coupled to the attachment portion 31 of the cam housing 30, by fully fastening the nuts 88 to the stud bolts 63 of the EGR valve 60, the EGR valve 60 is moved such that the flange surface 61F of the first valve flange 61 moves toward the flange surface 53F of the first cooler flange 53. Such movement of the EGR valve 60 limits bending of the EGR cooler 50 when the gap S is eliminated and reduces stress generated at the EGR cooler 50.

(2) Further, the clearance value C1 is set to be less than the clearance value C2, which is a value obtained by subtracting the shank diameter d1 of the bolt 82 from the inner diameter D2 of the bolt hole 67 into which the bolt 82 is inserted to fasten the fixing portion 66 to the attachment portion 31. In other words, the clearance between the inner circumferential surface of the insertion hole 68 and the outer circumferential surface 91 of the pin 90 is less than the clearance between the inner circumferential surface of the bolt hole 67 and the outer circumferential surface of the bolt shank 82G. Thus, the second embodiment improves the positioning accuracy of the EGR valve 60 in a state in which the fixing portion 66 of the EGR valve 60 is temporarily coupled to the attachment portion 31 in comparison with a structure that does not include the insertion holes 68 and the pins 90.

Third Embodiment

An internal combustion engine according to a third embodiment will now be described with reference to the drawings.

In the first embodiment, each pin 90 is a hollow rod. Further, the corresponding bolt 82 that fastens the fixing portion 66 to the attachment portion 31 is inserted into the pin 90.

Figure 6:
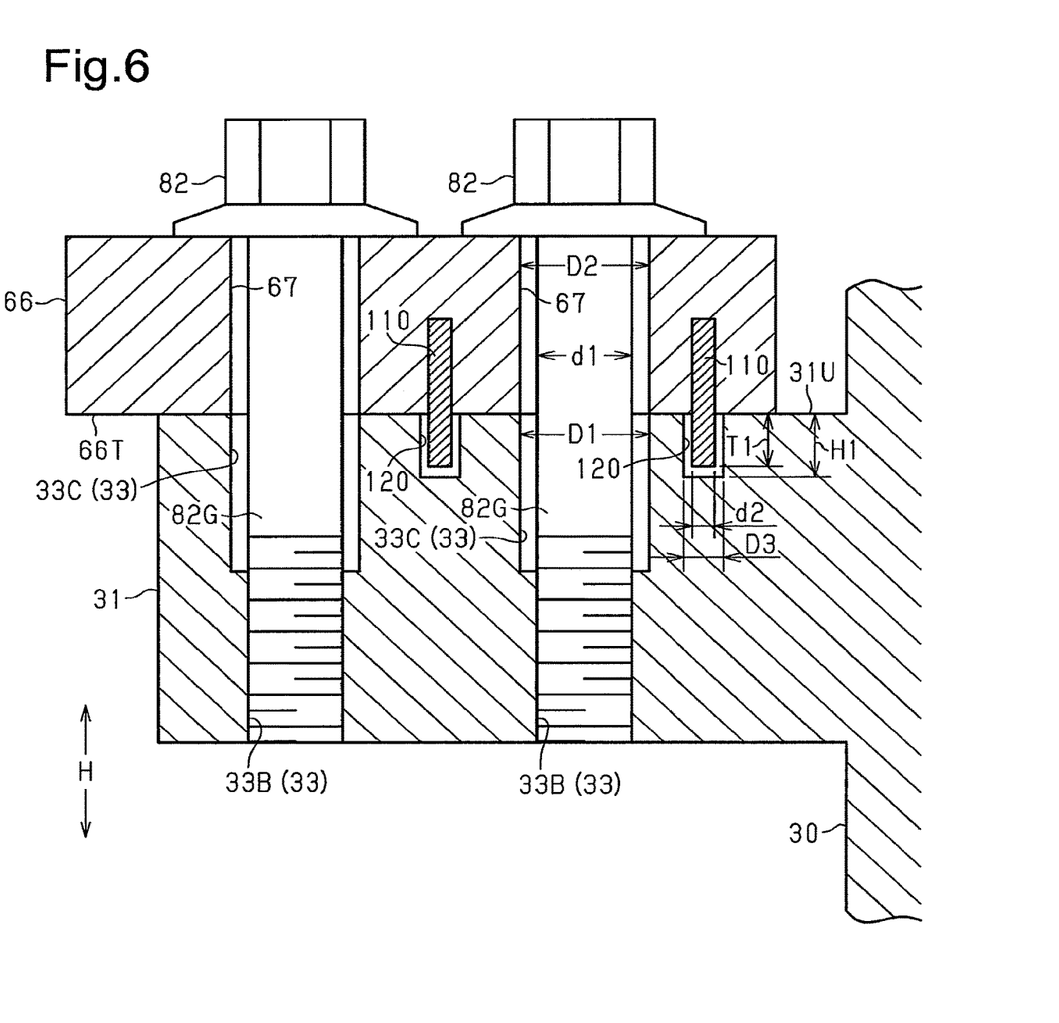
FIG. 6 is a cross-sectional view showing a fixing portion and an attachment portion in an internal combustion engine according to a third embodiment.

The third embodiment differs from the first embodiment in that pins 110 are solid, and insertion holes 120 into which the pins 110 are inserted are arranged at locations separate from the holes into which the bolts 82 that fasten the fixing portion 66 to the attachment portion 31 are inserted. The description hereafter of an internal combustion engine according to the third embodiment will focus on differences from the first embodiment. In FIG. 6, same reference numerals are given to those components that are the same as the corresponding components of the first embodiment.

FIG. 6 is a cross-sectional view of the attachment portion 31 cut in the vertical direction H when the fixing portion 66 of the EGR valve 60 is coupled to the attachment portion 31 of the cam housing 30.

Bolt holes 67 into which the bolts 82 are inserted extend thorough fixing portion 66.

The pins 110 are fixed to the fixing portion 66 at locations separate from the bolt holes 67 as viewed in the axial direction of the bolt hole 67. The pins 110 are press-fitted upward from the lower surface 66T of the fixing portion 66. The lower parts of the pins 110 project downward from the lower surface 66T of the fixing portion 66. The third embodiment includes two pins 110. However, the number of pins may be changed.

Each bolt fastening portion 33 of the attachment portion 31 includes a bolt hole 33C and the internal thread portion 33B. The bolt hole 33C into which the bolt 82 is inserted extends downward from the upper surface 31U of the attachment portion 31. The internal thread portion 33B is coaxial with the insertion bolt hole 33C and located downward from the bolt hole 33C. The external thread of the bolt 82 is engaged with the internal thread portion 33B. Further, an inner diameter D1 of the bolt hole 33C is set to be substantially the same as the inner diameter D2 of the bolt hole 67 and greater than the shank diameter d1 of the bolt shank 82G of the bolt 82 (D1=D2>d1).

The attachment portion 31 includes two insertion holes 120 into which the two corresponding pins 110 are inserted. The insertion holes 120 extend downward from the upper surface 31U of the attachment portion 31. The insertion holes 120 are arranged at locations separate from the bolt holes 33C into which the bolts 82 are inserted.

A depth H1 of the insertion hole 120 from the upper surface 31U is set to be greater than or equal to a projection length T1 of the pin 110 from the lower surface 66T (H1≥T1).

An inner diameter D3 of the insertion hole 120 is set to be greater than an outer diameter d2 of the pin 110 (D3>d2). A value obtained by subtracting the outer diameter d2 of the pin 110 from the inner diameter D3 of the insertion hole 120 is referred to as a clearance value C1 (C1=D3−d2). Further, a value obtained by subtracting the shank diameter d1 of the bolt shank 82G from the inner diameter D2 of the bolt hole 67 is referred to as a clearance value C2 (C2=D2−d1). The clearance value C1 is less than the clearance value C2 (C1<C2).

The operation and advantages of the third embodiment will now be described.

(1) As shown in FIG. 6, the pins 110 are press-fitted into the fixing portion 66 of the EGR valve 60. The inner diameter D3 of the insertion holes 120, into which the pins 110 are inserted, in the attachment portion 31 of the cam housing 30 is set to be greater than the outer diameter d2 of the pins 110.

Thus, in a state in which the fixing portion 66 of the EGR valve 60 is temporarily coupled to the attachment portion 31 of the cam housing 30, the pins 110 are movable in the radial direction of the insertion holes 120 in the insertion holes 120. That is, in the temporary coupling state, the EGR valve 60 is movable on the upper surface 31U of the attachment portion 31 to an extent allowed by the clearance value C1 at maximum.

Thus, the third embodiment has the same advantages as the first embodiment described with reference to FIG. 4 and the like. Specifically, even if the gap S is formed in the state in which the fixing portion 66 of the EGR valve 60 is temporarily coupled to the attachment portion 31 of the cam housing 30, by fully fastening the nuts 88 to the stud bolts 63 of the EGR valve 60, the EGR valve 60 is moved such that the flange surface 61F of the first valve flange 61 moves toward the flange surface 53F of the first cooler flange 53. Such movement of the EGR valve 60 limits bending of the EGR cooler 50 when the gap S is eliminated. This reduces stress generated at the EGR cooler 50.

(2) Further, the clearance value C1 is set to be less than the clearance value C2, which is a value obtained by subtracting the shank diameter d1 of the bolt 82 from the inner diameter D2 of the bolt hole 67 into which the bolt 82 that fastens the fixing portion 66 to the attachment portion 31 is inserted. In other words, the clearance between the inner circumferential surface of the insertion hole 120 and the outer circumferential surface of the pin 110 is less than the clearance between the inner circumferential surface of the bolt hole 67 and the outer circumferential surface of the bolt shank 82G. Thus, the third embodiment improves the positioning accuracy of the EGR valve 60 in the state in which the fixing portion 66 of the EGR valve 60 is temporarily coupled to the attachment portion 31 in comparison with a structure that does not include the insertion holes 120 and the pins 110.

It should be apparent to those skilled in the art that the present invention may be embodied in many other specific forms without technically contradicting each other or departing from the spirit or scope of the invention. Particularly, it should be understood that the present invention may be embodied in the following forms.

In the third embodiment, the pins 110 are arranged in the fixing portion 66 of the EGR valve 60, and the insertion holes 120 are arranged in the attachment portion 31 of the cam housing 30. In addition or instead, the insertion holes 120 may be arranged in the fixing portion 66 of the EGR valve 60, and the pins 110 may be arranged in the attachment portion 31 of the cam housing 30.

In the third embodiment, the pin 110 is a solid pin. However, the pin 110 may be a hollow pin.

In the above embodiments, the second cooler flange 55 of the EGR cooler 50 is fastened to the cylinder head 20. In addition or instead, the second cooler flange 55 may be fastened to other portions of the main body of the internal combustion engine such as the cam housing 30 and the cylinder block 40.

In the above embodiments, the fixing portion 66 of the EGR valve 60 is fastened to the cam housing 30. In addition or instead, the fixing portion 66 may be fastened to other portions of the main body of the internal combustion engine such as the cylinder head 20 and the cylinder block 40.

In the above embodiments, in the internal combustion engine 10, the cam housing 30 is separate from the cylinder head 20. Alternatively, in the internal combustion engine 10, the cam housing 30 may be formed integrally with the cylinder head 20, and the attachment portion 31 may be arranged on the cylinder head 20.

In the above embodiments, the pipe 52 of the EGR cooler 50 is curved to extend in a direction substantially orthogonal to the longitudinal direction of the cooling unit 51. Alternatively, the pipe 52 may be a straight pipe that extends in a direction substantially parallel to the longitudinal direction of the cooling unit 51.

The shapes of the EGR cooler 50 and the EGR valve 60 shown in the drawings may be changed.

What is claimed is:

1. An internal combustion engine, comprising:
  a main body of the internal combustion engine including an attachment portion;
  an EGR cooler including a portion fastened to the main body of the internal combustion engine, wherein the EGR cooler is configured to lower a temperature of exhaust gas returned to an intake passage of the internal combustion engine; and
  an EGR valve including a fixing portion fastened to the attachment portion with a bolt and a connection portion fastened to the EGR cooler, wherein the EGR valve is configured to adjust a flow rate of the exhaust gas returned to the intake passage, wherein
  a pin is fixed to one of the fixing portion and the attachment portion,
  an insertion hole into which the pin is inserted is arranged in the other one of the fixing portion and the attachment portion,
  an inner diameter of the insertion hole is greater than an outer diameter of the pin, and
  a value obtained by subtracting the outer diameter of the pin from the inner diameter of the insertion hole is less than a value obtained by subtracting a shank diameter of the bolt from an inner diameter of a bolt hole in the fixing portion into which the bolt is inserted.

2. The internal combustion engine according to claim 1, wherein
   the pin is a hollow rod, and
   the bolt is inserted into the pin.

3. The internal combustion engine according to claim 1, wherein the insertion hole is arranged at a location separate from the bolt hole as viewed in an axial direction of the bolt hole.

\* \* \* \* \*